(12) United States Patent
Mangin et al.

(10) Patent No.: US 7,519,084 B2
(45) Date of Patent: Apr. 14, 2009

(54) ERROR CONTROL MECHANISM FOR A SEGMENT BASED LINK LAYER IN A DIGITAL NETWORK

(75) Inventors: Christophe Mangin, L'Hermitage (FR); Romain Rollet, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 626 days.

(21) Appl. No.: 10/959,995

(22) Filed: Oct. 8, 2004

(65) Prior Publication Data

US 2005/0265389 A1    Dec. 1, 2005

(30) Foreign Application Priority Data

Nov. 19, 2003    (EP)    .................................. 03292878

(51) Int. Cl.
    *H04J 3/24*    (2006.01)
(52) U.S. Cl. ...................................... 370/474; 370/394
(58) Field of Classification Search ................. 370/389, 370/393, 394, 474, 476
See application file for complete search history.

(56) References Cited

U.S. PATENT DOCUMENTS

| | | | |
|---|---|---|---|
| 5,440,545 A | | 8/1995 | Buchholz et al. |
| 6,389,016 B1 * | | 5/2002 | Sabaa et al. .................. 370/389 |
| 6,507,586 B1 * | | 1/2003 | Satran et al. .................. 370/432 |
| 6,683,850 B1 * | | 1/2004 | Dunning et al. ............. 370/231 |
| 6,778,558 B2 * | | 8/2004 | Balachandran et al. ...... 370/470 |

| | | | |
|---|---|---|---|
| 2002/0054570 A1 * | | 5/2002 | Takeda ........................ 370/252 |

(Continued)

OTHER PUBLICATIONS

Paul Lettieri, et al., "Adaptive Frame Length Control for Improving Wireless Link Throughput, Range, and Energy Efficiency", Electrical Engineering Department University of California, Los Angeles, XP-010270390, Mar. 29, 1998, pp. 564-571.

(Continued)

*Primary Examiner*—Ricky Ngo
*Assistant Examiner*—Kan Yuen
(74) *Attorney, Agent, or Firm*—Oblon, Spivak, McClelland, Maier & Neustadt, P.C.

(57) ABSTRACT

There is disclosed a method of transmitting data packets from a transmitter to a receiver each having a stack of communication protocol layers which comprises a data Link Layer (LL), by using a Segmentation And Re-assembly (SAR) mechanism implemented within a SAR layer intermediate between the LL and an upper layer, as well as an error recovery mechanism implemented within the LL. The SAR mechanism performs, in a transmission direction, the function of segmenting Parent Packets (PPs) handled by the upper layer into consecutive segments of shorter length and the function of providing some segmentation information. The segmentation information comprises, for each segment, a two-level sequence numbering comprising a PP Sequence Number (PPSN) which identifies the PP which said segment belongs to, and a Segment Sequence Number (SSN) which identifies the rank of the segment within the PP. The error recovery mechanism implements a selective retransmission scheme using forward and/or feedback signaling messages which embed the two-level segment numbering. In the receive direction, the SAR mechanism delivers to the upper layer a PP of given PPSN of which all constitutive segments are correctly received and re-assembled, irrespective of whether all PPs of sequence number lower than that PPSN are already delivered.

20 Claims, 2 Drawing Sheets

U.S. PATENT DOCUMENTS

2002/0090005 A1 7/2002 Jiang et al.
2002/0150040 A1* 10/2002 Tong et al. .................. 370/216
2004/0001499 A1* 1/2004 Patella et al. ................ 370/412
2004/0170193 A1* 9/2004 Schauer et al. .............. 370/474

OTHER PUBLICATIONS

M. C. Chuah, et al., "Performance Comparisons of Two Retransmission Protocols for CDMA", AT&T Bell Laboratories, XP-010162391, Apr. 28, 1996, pp. 272-276.

* cited by examiner

US 7,519,084 B2

ERROR CONTROL MECHANISM FOR A SEGMENT BASED LINK LAYER IN A DIGITAL NETWORK

BACKGROUND OF THE INVENTION

1. Technical Field

The present invention relates generally to communication system and in particular, to an error control mechanism for a segment based Link Layer (LL) in a digital network.

2. Related Art

Networks prone to relatively high error levels, such as wireless or power line networks, often require the implementation of error recovery mechanisms in the LL Layer of their stack of communication protocol layers, in addition to the error correction schemes which may be embedded in their PHYsical (PHY) Layer. Such schemes rely on added redundancy provided by, for instance, Viterbi or convolutional encoders/decoders.

Within the LL layer, a Medium Access Control (MAC) sub-layer provides access to the PHY layer. Data are exchanged between the LL layer and the PHY layer in the form of LL data units, through the MAC sub-layer.

Usually, when implemented in the LL, error recovery mechanisms rely on redundancy provided by the repetition of the lost or corrupted LL data units. Basically, some signalling runs between the transmitter and the receiver, which signalling advertises the data not correctly received by the receiver. The protocol used by that signalling belongs to the family of the Automatic Repeat reQuest (ARQ) protocols.

To improve resilience to errors and make the retransmission protocols more effective in terms of resource usage, efficient LL implementations are based on short data units that permit retransmission of the portion of data affected by errors only.

However, data actually exchanged by applications are long data packets (e.g. Ethernet packets) that, if transmitted as such, are, on the one hand, very sensitive to errors and, on the other hand, cause resource waste when they have to be retransmitted.

Long packets can be transmitted over a LL layer based upon short data units provided an adaptation is performed in an intermediate layer often called Segmentation And Re-assembly (SAR) layer. In the transmission direction, the SAR performs the function of segmenting the long packet handled by the upper layer into consecutive short data units also called segments. Some segmentation information is also provided that allows retrieving the upper layer packet delineation for further re-assembly. In the receive direction, the SAR reconstructs the upper layer packet by concatenating the successively received segments and exploiting the segmentation information. When such a segmentation scheme is carried out, the LL layer is said to be a segment based Link Layer.

ARQ protocols rely on the identification of the data units that is common to the transmitter and the receiver. Such identification is used by the protocol signalling so that the receiver indicates to the transmitter, via feedback information, which data units are not correctly received. The data unit identification is typically a sequence number specific to the data units handled by the considered layer only.

In order not to block transmission by waiting for the feedback information each time a data unit is emitted, a sliding window mechanism is often implemented, as is well known in the art.

Another known way to limit resource usage made by the retransmissions (compared to simple algorithms of the "Go-back-N" type) consists in implementing a Selective Repeat scheme. Such scheme uses indication in the feedback information of the individual incorrectly received data units, whereby only the incorrectly received data units are advertised by the receiver, and thus retransmitted.

Finally, some ARQ implementations also use forward signalling information to force the sliding window progression in the receiver in order to avoid window blocking effects, especially when the underlying transport is particularly prone to errors. This mechanism is often called "discard" mechanism and leads to upper layer packet loss.

Several problems arise when designing an ARQ protocol for an error prone system, that are amplified when the transmission resource is scarce, as in the types of networks mentioned above.

Resource used for signalling and retransmission must be as limited as possible. Limitation of the resource used for retransmission can be achieved by basing the data transfers on short data units and implementing a selective retransmission scheme. However, selective retransmission schemes require a more sophisticated signalling that may need more resource to be used. In addition, the behaviour of an ARQ transmitter can be improved (i.e. one can make it better use resource for its retransmission) by providing to it additional information about the receiver sliding window status in feedback messages sent by the receiver. Once again, this additional information is more complex and requires more resource to be used. An ARQ signalling based on compact and efficient messages has then to be designed.

In parallel, still in case of a LL layer based on short data units containing chunks of packets of an upper layer, discard mechanisms may lead to resource wasting. Indeed, if the criteria used to force the sliding window to advance are only relative to that very LL layer, the window progression may reach a data unit that is located anywhere in the corresponding upper layer packet. Particularly, this data unit may not be the first data unit in the upper layer packet, causing the transmitter to emit (or re-emit) the subsequent data units even though the upper layer packet cannot be re-assembled since its first chunk(s) is (are) lost.

U.S. Pat. No. 5,440,545 discloses a selective retransmission scheme. When a data packet is too long to fit into a single transmission packet, it is separated in N fragments. Each receiving device transmits an acknowledgement (ACK) signal back to the source device, which identifies the data packet of concern and which fragments of the data packet in question have or have not been received.

SUMMARY OF THE INVENTION

An object of the invention is to provide means for an error control mechanism applied to a segment based Link Layer that is more resource efficient.

A first aspect of the invention thus proposes a method of transmitting data packets from a transmitter to a receiver, each having a stack of communication protocol layers which comprises a data Link Layer (LL), by using a Segmentation And Re-assembly (SAR) mechanism implemented within a SAR layer intermediate between said LL layer and an upper layer, as well as an error recovery mechanism implemented within said LL layer. In a transmission direction (i.e., from the upper layer to the LL layer), said SAR mechanism performs the function of segmenting Parent Packets (PPs) handled by said upper layer into a given number n+1 of consecutive segments of shorter length, where n is a strictly positive integer, and the function of providing some segmentation information. In a receive direction (i.e., from the LL layer to the upper layer), it performs the function of reconstructing the upper layer PPs by concatenating received segments while exploiting said segmentation information and the function of delivering them to said upper layer. The segmentation information comprises, for each segment, a two-level sequence numbering comprising a PP Sequence Number (PPSN) which identifies the PP which said segment belongs to, and a Segment Sequence Number (SSN) which identifies its rank within said PP. The error recovery mechanism implements a selective retransmission scheme using forward and/or feedback signalling messages exchanged between the transmitter and the emitter, which messages embed said two-level segment numbering. In the receive direction, the SAR mechanism delivers to the upper layer a PP of given PPSN of which all constitutive segments are correctly received and re-assembled, irrespective of whether all PPs of sequence number lower than that PPSN are already delivered.

A second aspect of the present invention relates to a device for transmitting data packets from a transmitter to an receiver each having a stack of communication protocol layers which comprises a data Link Layer (LL), by using a Segmentation And Re-assembly (SAR) mechanism implemented within a SAR layer intermediate between the LL layer and an upper layer, as well as an error recovery mechanism implemented within the LL layer. The device comprises a first module for implementing the SAR mechanism, which performs, in a transmission direction:

the function of segmenting Parent Packets (PPs) handled by the upper layer into a given number n+1 of consecutive segments of shorter length, where n is a strictly positive integer, and the function of providing some segmentation information which comprises, for each segment, a two-level sequence numbering comprising a PP Sequence Number (PPSN) which identifies the PP which the segment belongs to, and a Segment Sequence Number (SSN) which identifies the rank of the segment within the PP; and, in a receive direction, the function of reconstructing the upper layer PPs by concatenating received segments while exploiting the segmentation information and the function of delivering them to the upper layer, the SAR mechanism being adapted for delivering to the upper layer a PP of given PPSN of which all constitutive segments are correctly received and re-assembled, irrespective of whether all PPs of sequence number lower than that PPSN are already delivered.

The device also comprises a second module for implementing the error recovery mechanism with a selective retransmission scheme using forward and/or feedback signalling messages exchanged between the transmitter and the emitter, which messages embed the two-level segment numbering.

The first and second modules may be implemented as software and/or hardware elements.

The terms "forward" and "feedback" are used herein in reference to the direction of the stream of user data sent over the transmission medium, i.e., from the transmitter to the emitter.

In preferred embodiments, the segments are protocol data units of fixed size.

The selective retransmission scheme may be based on a sliding window mechanism, the size of the sliding window being defined as a number of segments. Preferably, the maximum value of the size of the sliding window, in number of segments, is substantially half the size of the PPSN space.

The error recovery mechanism may use a detection of error scheme which relies on a Cyclic Redundancy Check (CRC) appended to each segment.

In addition, it may use a discard mechanism. Such mechanism may preferably use a specific forward message sent by the transmitter, which message contains the PPSN up to which the transmitter requests the receiver to advance its sliding window.

The proposed EC mechanism can be easily implemented: the required memory structure is simple and the generation and interpretation of signalling messages is straightforward. Thus, this simple processing at the LL level makes possible an implementation of a low latency ARQ.

The protocol is resource efficient thanks to compact and flexible signalling messages. They permit the implementation of advanced retransmission mechanism, in particular to reduce retransmission delay and to save retransmission resource.

The exploitation of segmentation information improves the efficiency of the discard mechanism.

In addition, the two-level sequence numbering enables the SAR mechanism to deliver reconstructed PPs in a loose order to the upper layer. This service can be profitable to applications with strong delay constraints and that can tolerate packet loss (interactive voice or video transmissions).

BRIEF DESCRIPTION OF THE DRAWINGS

Further features and advantages of the present invention will become more apparent from the description below. This is given purely by way of illustration and should be read in conjunction with the appended drawings, of which.

DESCRIPTION OF PREFERRED EMBODIMENTS

Figure 1:
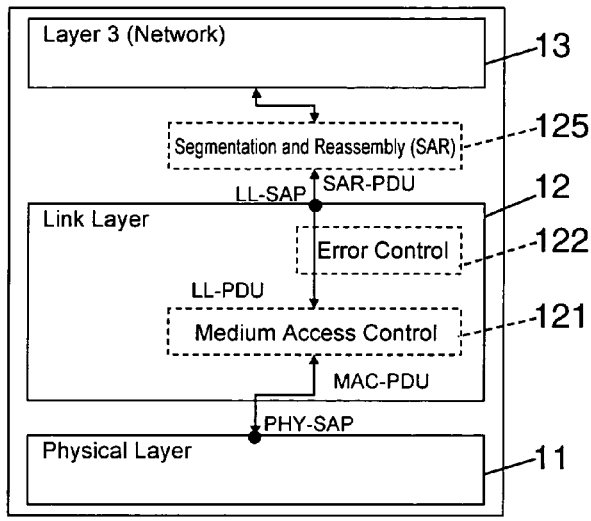
FIG. 1 is a view of an exemplary stack of protocol layers to which the method of transferring of the present invention may be applied.

The present invention is described herein below in one exemplary application as a protocol implemented within the data Link Layer (LL) layer of a network, which is compliant with the OSI ("Open System Interconnect") model of ISO ("International Standardization Organization"). It will be appreciated, however, that the scope of the invention encompasses applications to any stack of communication protocol layers. In the drawings, like elements bear like references through all the Figures.

Definitions

FIG. 1 shows a part of a stack of communication protocol layers, namely the first three layers of the 7-layer network model according to OSI standard. The following description thereof is aimed at introducing some definitions which will be used in the remaining of this document.

A first layer 11, also known as the PHYsical (PHY) layer, provides a physical interface between many users. For instance, users are stations of a wireless or power line communication network.

A second layer 12, which is called the data Link Layer (LL), is responsible for sharing service provided by the PHY layer. The LL layer usually contains a Medium Access Control (MAC) and an Error Control (EC) sub-layers respectively 121 and 122. The MAC sub-layer 121 organises access to the PHY layer 11 and exchanges data with a Service Access Point (PHY-SAP) of the PHY layer by using basic protocol data units called MAC-PDUs. The EC sub-layer 122 performs operation of an Error Control (i.e., error recovery) and flow control mechanism.

Finally, a third layer 13 is the Layer 3 (network) layer which is also referred to as the upper layer in this document. It delivers, respectively receive long data units or packets (e.g. LLC 802.2) to, respectively from, the LL layer, through an intermediate adaptation layer 125 called Segmentation And Re-assembly (SAR) layer. The latter is in charge of the segmentation scheme. It exchanges data with a Service Access Point (LL-AP) of the LL layer.

In the following description of an exemplary embodiment of the invention, the LL layer is meant as the communication layer handling the short data units. According to the ISO layer representation terminology, the above mentioned short data units are called LL-Protocol Data Units (LL-PDUs). The packets provided by or returned to he upper layer 13 are called Parent Packets (PPs). The PPs are segmented into segments by the SAR layer 125. These segments are called SAR-PDUs, and are encapsulated at the LL layer in respective protocol data units which are the LL-PDUs.

Basic Principles

It will first be exposed the basic principles of the proposed Error Control mechanism, which relies on the use of information provided by the SAR layer 125 to improve ARQ retransmission and signalling efficiency. This information is included in the segments or LL-PDUs, and in the ARQ protocol messages.

PPs are respectively identified by a sequence number that is attributed, in the transmit direction, by the SAR layer 125 when it receives the PP from the upper layer 13. Each SAR-SDU within a PP is identified by a sequence number equal to its rank in the PP. As a consequence, each LL-PDU is uniquely identified by combining the sequence number, within its PP, of the SAR-PDU it contains, and the PP sequence number that SAR-PDU belongs to.

Detection of error is performed thanks to a Cyclic Redundancy Code appended to each LL-PDU that protects the entire LL-PDU.

An ARQ window is implemented at the LL-PDU level. The ARQ protocol signalling messages permit the synchronisation of the transmitter's and receiver's representations of the ARQ window.

Feedback signalling messages embed the two-level sequence numbering to advertise the receiver sliding window status to the transmitter when errors occur so that the transmitter can selectively retransmit the erroneous LL-PDUs. When the transmission is error free, only the PP sequence number level is used to acknowledge the reception of both the PPs and the LL-PDUs.

Similarly, a discard function uses a specific message sent by the transmitter, that contains the PP sequence number up to which the transmitter requests to advance the ARQ window.

Finally, a specific ARQ protocol message is defined, that permits the transmitter to explicitly request feedback information from the receiver. This message may also be used to request the status of a list of given PPs.

The two latter messages are acknowledged by the receiver via feedback messages.

Figure 2:
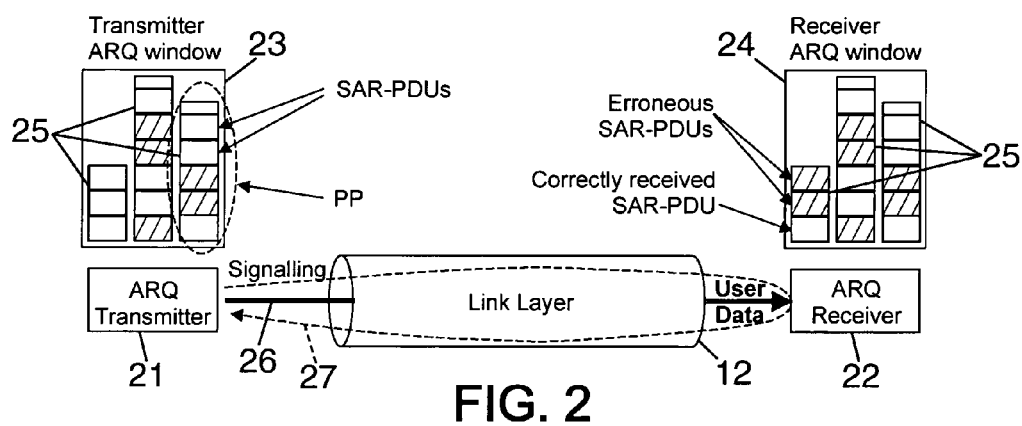
FIG. 2 is a diagram illustrating a segment based Link Layer data transmission between a transmitter and a receiver.

FIG. 2 illustrates an error correction function instance which is applied to a flow of LL-PDUs streaming from an ARQ transmitter 21 to an ARQ receiver 22.

The above-mentioned ARQ window is a sliding window used by the transmitter to determine the PPs of which it is able to transmit LL-PDUs. In practise, the transmitter implements a first representation 23 of the ARQ window, called Transmitter ARQ window, and, in parallel, the receiver 22 implements a second representation 24 thereof, called Receiver ARQ window. Those implementations of the ARQ window use memory buffers in the transmitter 21 and the receiver 22, respectively.

In the example shown in FIG. 2, it is assumed that the size of the ARQ window is such that it allows the transmitter to transmit the three PPs represented as three respective columns generally designated by the reference sign 25. The PP being of respective sizes, said columns are of respective heights. However, each column is segmented in segments, of same size, except for the last one (that one represented at the top of each column) which might be of smaller size. Each one of said segments forms a respective SAR-PDU. In FIG. 2, SAR-PDUs correctly received by the ARQ receiver are represented by white rectangles, whereas erroneous or corrupted SAR-PDUs are represented by cross hatched rectangles. It will be appreciated that the representation of the sliding window in the transmitter is not synchronised with representation of the sliding window in the receiver.

The user data streaming through the Link Layer 12 is symbolized by in bold line 26 from the ARQ transmitter 21 to the ARQ receiver 22. The stream of signalling information between the ARQ transmitter 21 and the ARQ receiver 22 is symbolized by dotted line 27.

User Data Format

Figure 3:
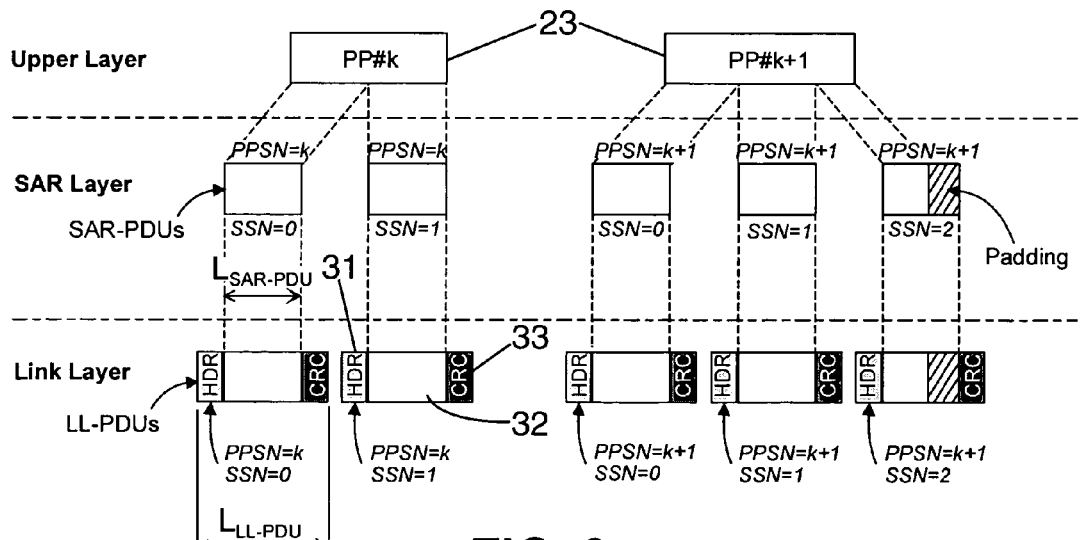
FIG. 3 is a diagram illustrating the two-level sequence numbering implemented in the segmentation scheme according to the invention.

FIG. 3 illustrates the two-level sequence numbering used by the segmentation scheme according to the present invention.

For the sake of simplification, it is assumed that the LL-PDUs and, consequently, the SAR-PDUs have a fixed length, respectively $L_{LL-PDU}$ and $L_{SAR-PDU}$.

As shown in Figure, the PPs 23 are attributed a PP Sequence Number (PPSN) equal to k for the PP (PP#k) represented in the left hand side of the Figure and to k+1 for the PP (PP#k+1) represented in the right hand side of the Figure. Each PP is segmented in a given number n+1 of SAR-PDUs by the SAR layer. For PP#k, n is equal to 1. And for PP#k+1, n is equal to 2. The n+1 SAR-PDUs within the PP are sequentially numbered via a Segment Sequence Number (SSN) ranging from 0 to n. Stated otherwise, the SSN of a given SAR-PDU is equal to its rank within the PP which it belongs to.

If the length of a PP is not exactly a multiple of $L_{SAR-PDU}$, which is the case for PP#k+1 as opposed to PP#k, the SAR layer inserts padding in the last SAR-PDU of the PP (i.e., the one for which SSN=n).

In the following data unit format description, the sole information used by the error control mechanism is mentioned. The LL-PDUs comprise the three following fields:
 a payload field 32 containing a SAR-PDU;
 a header field (HDR) 31 containing the SAR-PDU's SSN concatenated with the PPSN of the PP the SAR-PDU belongs to; and,
 a Cyclic Redundancy Code (CRC) field 33, said CRC being computed over the first two fields 31 and 32.

Data Structures

As mentioned before, the Error Control mechanism according to the present invention relies on a sliding window which elements are Parent Packets. The evolution of the sliding window is ruled by both the ARQ receiver and the ARQ transmitter through the signalling messages which will be described later.

Before starting an exchange of data, the ARQ transmitter and the ARQ receiver may agree on the of an ARQ Window Size (ARQWSize) value, by a means not described in this document. This procedure prevents the receiver from LL-PDU loss due to a lack of memory buffer. The receiver negotiates an ARQWSize value which is compatible with its available memory. If no reservation procedure is initiated, the receiver is still able to stop the ARQ transmitter by using a flow control mechanism.

The size in bytes (or bits) of the ARQ sliding window is an important parameter conditioning the performance of the mechanism, according to the so called "bandwidth×Round Trip Time" product rule. Since PPs are of variable length, it is not appropriate to specify the ARQWSize value as a number of PPs, but rather as a number of LL-PDUs (or SAR-PDUs), the latter having a fixed size.

The maximum ARQWSize value, in number of LL-PDUs, is preferably substantially equal to half the size of the PPSN space, so that sequence numbers remain comparable.

The PPSN space shall be dimensioned so that the maximum throughput can be reached even in the worst case where one PP is included into a sole LL-PDU. For the sake of simplification, LL-PDUs and their SSNs are considered equivalent in the following description.

The ARQ window is characterised by two boundary values, respectively a Bottom of ARQ Window (BotARQWin) value and a Top of ARQ Window (TopARQWin) value. Those values are defined as follows: BotARQWin corresponds to the incorrectly received LL-PDU having the lowest PPSN and SSN, whereas TopARQWin corresponds to the transmitted LL-PDU with the highest PPSN and SSN. It shall be noted that the transmitter and receiver TopARQWin and BotARQWin values are not necessarily always identical over time.

At any time, the number of LL-PDUs comprised between the transmitter's BotARQWin and TopARQWin boundary values must remain strictly lower than ARQWSize.

It shall be noted that, when taking into account PP boundaries, the size of the memory buffer implementing the ARQ window may be greater or equal to ARQWSize.

Figure 4:
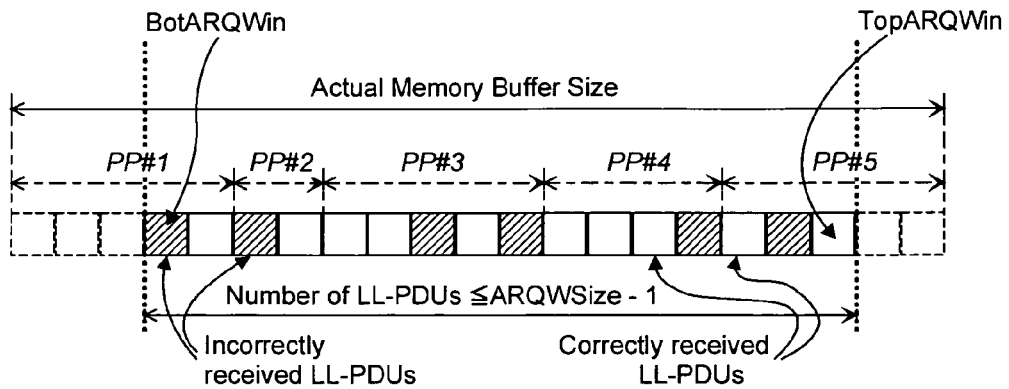
FIG. 4 is a diagram illustrating the sliding window mechanism according to an embodiment of the invention; and, FIG. 5 is a chart illustrating signalling messages exchanged according to an exemplary embodiment of the present invention.

The foregoing considerations are illustrated by the diagram of FIG. 4 in the example shown, the correctly received SAR-PDUs are represented by white squares, and the incorrectly received SAR-PDUs are represented by cross hatched squares. Here, the incorrectly received LL-PDU with the lowest SSN is the fourth LL-PDU of packet PP#1, and the most recently transmitted LL-PDU is the second LL-PDU of packet PP#5.

Signalling Messages

Three types of signalling messages are defined: ARQ FeedBack (AFB) message, ARQ DisCard (ADC) message, and ARQ Request for Feedback (ARF) message.

An AFB message is sent by an ARQ receiver to its peer ARQ transmitter to advertise PPs and LL-PDUs reception status. AFB messages are sent upon reception of LL-PDUs according to rules not described in this document.

An ADC message is sent by an ARQ transmitter to its peer ARQ receiver to force an ARQ window advance up to a PPSN specified in the message and to eventually discard incompletely received PPs which PPSN is lower than the PPSN specified in the message. The ADC reception is acknowledged by the receiver by returning a corresponding AFB message to the transmitter. The rules used to determine when to send an ADC message are not described in this document.

An ARF message is sent by an ARQ transmitter to its peer ARQ receiver to request an AFB message from the latter. The ARF message reception is acknowledged by the receiver by returning a corresponding AFB message to the transmitter.

The rules used to determine when to send an ARF message are not described in this document.

The following subsections only describe the content of the messages that is relative to the proposed mechanism.

ARQ FeedBack (AFB) Message

The AFB message contains a collection of Acknowledgement Vectors (AKV), as shown in table I below, that may be empty (there, the number AKV_NB being equal to zero). In that case the AFB message is only used to perform Flow Control on the ARQ transmitter. In one embodiment, the FLOW_CTL flag, when set, indicates to the ARQ transmitter that it must stop emitting new LL-PDUs, that is LL-PDUs belonging to further PPs and/or LL-PDUs belonging to the same PP but having higher SSN than the last transmitted LL-PDU. To resume transmission of new segments, an AFB message with the FLOW_CTL flag cleared is send by the ARQ receiver.

TABLE I

| Field name | Number of occurrences | Description |
| --- | --- | --- |
| FLOW_CTL | 1 | Flow Control flag |
| AKV_NB | 1 | Number of AKVs in the AFB |
| AKV | 0-n | Collection of Acknowledgement Vectors |

Each AKV corresponds to a given PP and contains the fields described in Table II below.

TABLE II

| Field name | Description |
| --- | --- |
| PPSN | PP Sequence Number. |
| BM_PROVIDED | Indicates if the Bit Map and Bit Map Length information associated to the PP is appended at the end of the AKV. |
| FIRST_CORRUPTED | Flag indicating if the signalled PP is the first received PP that contains corrupted SAR-PDUs. |
| FIRST_RECEIVED | Flag indicating if the signalled PP is the first PP that contains at least one correct SAR-PDU. |
| LAST_RECEIVED | Flag indicating if the signalled PP is the last PP that contains at least one correct SAR. |
| BM_LENGTH | Length of the Bit Map in bits |
| BM | Bit Map that indicates which SAR-PDUs are corrupted within the signalled PP. |

Signalling of individual LL-PDU reception status within a given PP is realised via bitmaps. A bit of rank i in the bit map reflects the reception status of the SAR-PDU which SSN equals i in said PP. A bit is set when the corresponding LL-PDU is correctly received, and it is cleared otherwise.

The BM_PROVIDED flag indicates whether the BM_LENGTH and BM fields are included in the message. These latter fields are included to indicate to the ARQ transmitter which LL-PDUs are incorrectly received, or not yet received, within the PP specified by the PPSN field.

The meaning of an AFB message further depends on both the FIRST_CORRUPTED, FIRST_RECEIVED and LAST_RECEIVED flags settings.

If the FIRST_CORRUPTED flag is set, PPSN indicates the sequence number of the PP located at the bottom of the ARQ window, i.e. the lowest-PPSN PP for which at least one SAR-PDU is missing (e.g. packet PP#1 in the example shown in FIG. 4). Stated otherwise, this flag, when set, indicates that the PP specified by the PPSN field is the received PP with the lowest PPSN that contains at least one corrupted segment.

If the FIRST_RECEIVED flag is set, PPSN indicates the sequence number of the first PP, located after the bottom of the receiver ARQ window, for which at least one SAR-PDU has been received yet (e.g. packet PP#1 in the example shown in FIG. 4). Stated otherwise this flag, when set, indicates that the PP specified by the PPSN field is the PP with the highest PPSN that contains at least one correctly received segment.

If the LAST_RECEIVED flag is set, PPSN indicates the sequence number of the PP located at the top of the receiver ARQ window, i.e. the highest-PPSN PP of which at least one SAR-PDU has been received yet (e.g. packet PP#5 in the example shown in FIG. 4).

It shall be noted that FIRST_CORRUPTED, FIRST_RECEIVED and LAST_RECEIVED flags may be set simultaneously.

ARQ DisCard (ADC) Message

This forward signalling message comprises the field described in Table III below.

TABLE III

| Field name | Description |
| --- | --- |
| PPSN | Sequence Number of the highest discarded PP. |

By sending an ADC message, the ARQ transmitter requests the progression of the bottom of the ARQ window up to the PP which Sequence Number equals PPSN+1. Stated otherwise, this field contains the PPSN of the PP of highest PPSN to be discarded. The ARQ receiver acknowledges receipt of an ADC message from the ARQ transmitter by sending a feedback signalling message (i.e., an AFB message) to the latter. The ARQ transmitter is thus confirmed of the progression of the ARQ window on the receiver side.

ARQ Request for Feedback (ARF) Message

This forward signalling message comprises the fields described in Table IV below.

TABLE IV

| Field name | Number of occurrences | Description |
| --- | --- | --- |
| HPPSN | 1 | Highest PP Sequence Number sent by the ARQ transmitter. |
| PPSN | 0-n | Sequence numbers of the PP which reception status is required by the transmitter. |

By sending an ARF message, the ARQ transmitter requests an AFB message from the ARQ receiver and indicates simultaneously the highest PP Sequence Number it has sent so far.

In addition, the ARQ transmitter can optionally ask for the status of particular PPs by specifying a series of PP Sequence Numbers in successive PPSN fields.

Transmitter and Receiver Operation

Figure 5:
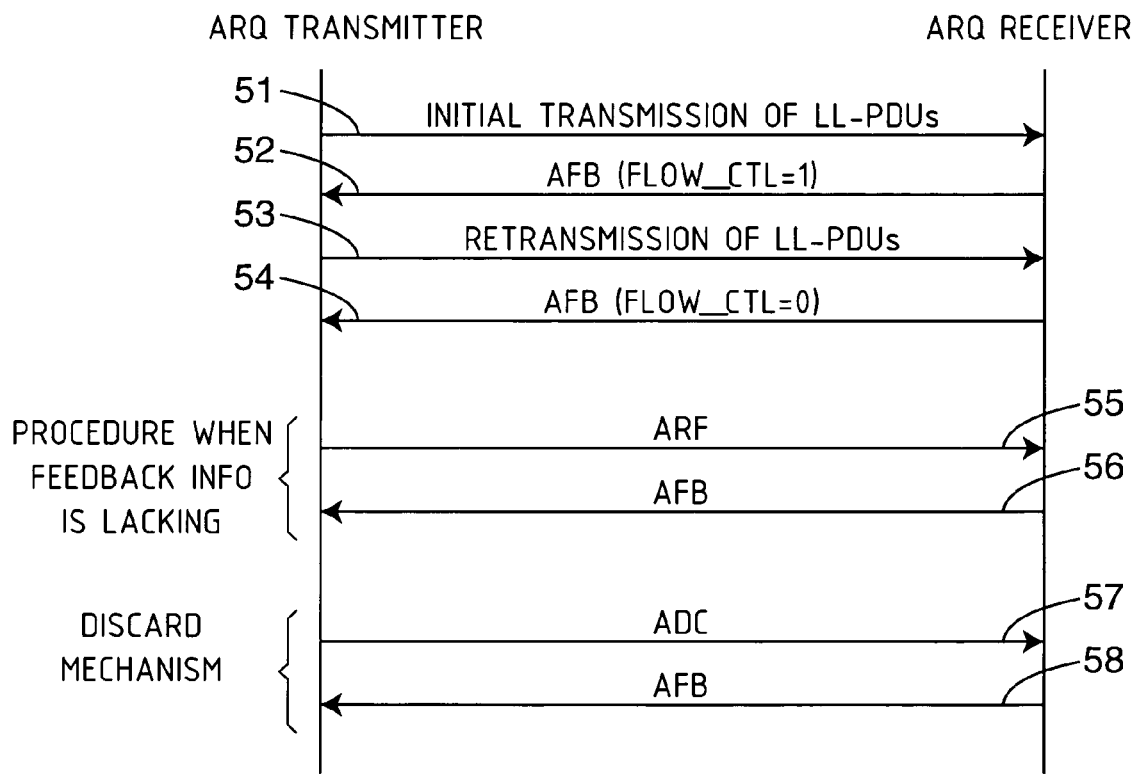

Operation of the transmitter and receiver, in particular usage of the signalling message presented in the above section, will now be further explained in view of the flow chart of FIG. 5.

Transmitter Operation

The ARQ transmitter can perform initial transmission 51 of consecutive LL-PDUs without receiving any AFB message as long as their SSN is comprised within the ARQ window, or it has received no AFB message with the FLOW_CTL flag set.

It can also retransmit any LL-PDU belonging to the ARQ window without any condition. Incorrectly received or missing LL-PDUs indicated by the receiver through AFB messages are preferably retransmitted.

Upon reception of an AFB message 52 with the FLOW_CTL flag set, the transmitter stops emitting new LL-PDUs. In this state, the ARQ transmitter may perform only retransmission 53 of LL-PDU until it receives an AFB message 54 with the FLOW_CTL bit cleared.

The transmitter can request the reception status of particular PPs by sending an ARF message 55 to the receiver. Acknowledgment 56 of said ARF-message is performed by the receiver by sending a corresponding AFB message to the transmitter. This procedure is useful when the transmitter is lacking feedback information.

When the transmitter triggers a discard procedure, it shall first emit an ADC message 57 to the ARQ receiver. Then, it shall wait for an AFB message 58 that acknowledges at least the PP specified in the discard message. Once the AFB message received, the transmitter can let its ARQ window advance.

Receiver Operation

The receiver shall decode and check each received LL-PDU by using the CRC field. If the check fails, the LL-PDU is rejected and considered as corrupted. Otherwise, the receiver checks the PPSN and SSN consistency, discard the LL-PDU if inconsistent, or delivers it to the SAR sub-layer if consistent.

In each emitted AFB, the receiver may indicate the PPSN of the first incorrectly received or missing LL-PDU (BotARQWin) by setting the FIRST_CORRUPTED flag. If any LL-PDUs are corrupted, it can indicate them to the transmitter by adding an AKV with the BM_PROVIDED flag set. Each AKV contains the PPSN of an incomplete PP and the bitmap that describes the reception status of the PP's constituting LL-PDUs.

In case no specific ARQ window size is agreed upon, if the receiver's memory space becomes insufficient (i.e. the BotARQWin stalls while TopARQWin continues progressing), the receiver can set the FLOW_CTL flag in an AFB message so that the transmitter stops emitting further LL-PDUs.

Upon reception of an ARF message from the transmitter, the receiver shall acknowledge receipt of said ARF message by sending an AFB message including, in addition to the indication of its BotARQWin's PPSN, the AKVs corresponding to the optionally requested PPs status containing their respective BM.

Upon reception of a ADC message, the ARQ receiver shall indicate to the SAR layer to deliver to the upper layer all complete PPs which PPSN is strictly lower than the PPSN specified in the ADC message. It shall also send an AFB that at least includes this PPSN, in order to acknowledge receipt of the ADC message. Incomplete PPs covered by the latter AFB are discarded.

One embodiment of the present invention provides that, if all LL-PDUs belonging to a PP of a given PPSN are correctly received, the PP is re-assembled and delivered to the upper layer by the SAR layer, even though LL-PDUs belonging to a PP with a lower PPSN are missing. Stated otherwise, the SAR mechanism delivers to the upper layer a PP of given PPSN, of which all constitutive segments are correctly received, irrespective of whether all PPs of sequence number lower than said PPSN are already delivered. This property is called PP re-assembly with loose order in opposition to a PP re-assembly with strict ordering, where the PPs would be re-assembled and delivered to the upper layer in the strict order of their PPSN.

The present invention can be implemented in hardware, software, or a combination of hardware and software. Any processor, controller, or other apparatus adapted for carrying out the functionality described herein is suitable. A typical combination of hardware and software could include a general purpose microprocessor (or controller) with a computer program that, when loaded and executed, carries out the functionality described herein.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

The invention claimed is:

1. A method of transmitting data packets from a transmitter to a receiver, the transmitter and the receiver including a stack of communication protocol layers and using a Segmentation and Re-assembly mechanism (SAR), the method comprising the steps of:
   segmenting parent data packets of an upper layer of the protocol layers by the SAR mechanism at the transmitter into at least two consecutive segments having a shorter length than the parent data packets;
   generating a two-level segment numbering based on said segmenting by the SAR mechanism, the two-level segment numbering include a parent data packet sequence number configured to identify the parent data packet for each segment, and a segment sequence number configured to identify a rank of the segment within the parent data packet;
   sending forward signaling messages from the transmitter to the receiver, and sending feedback signaling messages from the receiver to the transmitter, at least one of the forward and the feedback signaling messages including the two-level segment numbering, the forward signaling message including a discard request forward signaling message;
   reconstructing the parent data packets of the upper layer by concatenating received segments at the receiver by using the two-level segment numbering of said forward signaling message;
   selective retransmitting segments detected by an error recovery mechanism, by using at least one of forward signaling message and feedback signaling message;
   discarding segments based on the discard request forward signaling message, the discard request forward signaling message including a parent data packet sequence number; and
   delivering to the upper layer a parent data packet of a determined parent data sequence number when all the segments of the parent data packet have been correctly received and reconstructed.

2. The method of transmitting data packets according to claim 1, wherein the feedback signaling message further comprises:
   an automatic repeat request (ARQ) feedback signaling message that includes acknowledgement vectors, each of the acknowledgement vectors corresponding to a received parent data packet,
   wherein the acknowledgement vector includes a field with the parent data sequence number of the received parent data packet.

3. The method of transmitting data packets according to claim 2, wherein the acknowledgement vector further comprises:
   a bit map having at least two bits, wherein one bit indicates that the segment of the segment sequence number within the received parent data packet has been incorrectly received or is not yet received.

4. The method of transmitting data packets according to claim 2, wherein the automatic repeat request (ARQ) feedback signaling message further comprises:
   a flag configured to perform a flow control of the transmitter.

5. The method of transmitting data packets according to claim 4, wherein the flag is configured to indicate that the transmitter has to stop transmitting new segments when the flag is set, and is configured to indicate that the transmitter has to resume transmitting new segments when the flag is not set.

6. The method of transmitting data packets according to claim 4, wherein the acknowledgement vector further comprises:
   a flag configured to indicate that the received parent data packet is a data packet with a lowest parent data packet sequence number that includes at least one incorrectly received segment.

7. The method of transmitting data packets according to claim 4, wherein the acknowledgement vector further comprises:
   a flag configured to indicate that the received parent data packet is a data packet with a highest parent data packet sequence number that includes at least one correctly received segment.

8. The method of transmitting data packets according to claim 4, wherein the acknowledgement vector further comprises:
   a flag configured to indicate that the received parent data packet is a data packet with a lowest parent data packet sequence number that includes at least one correctly received segment.

9. The method of transmitting data packets according to claim 1, wherein the discard request forward signaling message is an automatic repeat request (ARQ) discard forward signaling message, the ARQ discard forward signaling message including:
   a field with the parent data packet sequence number of the parent data packet with the highest parent data packet sequence number that are to be discarded.

10. The method of transmitting data packets according to claim 1, further comprising the step of:
    acknowledging a reception of the discard request forward signaling message from the transmitter by sending a feedback signaling message to the transmitter.

11. The method of transmitting data packets according to claim 1, wherein the feedback signaling message further includes:
    an automatic repeat request (ARQ) feedback signaling message that includes a first field including a parent data packet sequence number of a parent data packet having the highest parent data packet sequence number sent by the transmitter, and a second field including a parent data packet sequence number of a parent data packet where the receiver has requested a reception status.

12. The method of transmitting data packets according to claim 11, further comprising the step of:
    acknowledging a reception of the a automatic repeat request feedback signaling message from the transmitter by sending a feedback signaling message to the transmitter.

13. The method of transmitting data packets according to claim 1, wherein the segments are protocol data units of fixed size.

14. The method of transmitting data packets according to claim 13, wherein in said step of selective retransmitting segments the error recovery mechanism uses a sliding window to analyze the segments, a size of the sliding window being defined as a number of segments.

15. The method of transmitting data packets according to claim 14, wherein a maximum size of the sliding window is substantially half a size of a number of parent data packet sequence number in a parent data packet.

16. The method of transmitting data packets according to claim 1, wherein the two-level segment numbering is transmitted within a header that is appended to each transmitted segment.

17. The method of transmitting data packets according to claim 1, wherein the error recovery mechanism uses a segment based error detection scheme.

18. The method of transmitting data packets according to claim 1, wherein said step of delivering is performed irrespective of whether all parent data packets of a sequence number being lower than the determined parent data sequence number are already delivered.

19. A device for transmitting data packets from a transmitter to a receiver, the transmitter and the receiver including a stack of communication protocol layers and using a Segmentation and Re-assembly mechanism (SAR), the device comprising:

a segmentation unit configured to segment parent data packets of an upper layer of the protocol layers by the SAR mechanism at the transmitter into at least two consecutive segments having a shorter length than the parent data packets;

a generation unit configured to generate a two-level segment numbering based on said segmentation by the segmentation unit, the two-level segment numbering include a parent data packet sequence number configured to identify the parent data packet for each segment, and a segment sequence number configured to identify a rank of the segment within the parent data packet;

a sending unit configured to forward signaling messages from the transmitter to the receiver, and sending feedback signaling messages from the receiver to the transmitter, at least one of the forward and the feedback signaling messages including the two-level segment numbering, and the forward signaling message includes a discard request forward signaling message;

a reconstructing unit configured to reconstruct the parent data packets of the upper layer by concatenating received segments at the receiver by using the two-level segment numbering of said forward signaling message, and configured to discard segments based on the discard request forward signaling message, the message including a parent data packet sequence number;

a retransmission unit configured to selectively retransmit segments detected by an error recovery mechanism, by using at least one of forward signaling message and feedback signaling message; and a delivery unit configured to deliver to the upper layer a parent data packet of a determined parent data sequence number, where all the segments of the parent data packet have been correctly received and reconstructed.

20. The device for transmitting data packets according to claim 19, wherein the sending unit further includes:

a repeat request sending unit configured to send an automatic repeat request (ARQ) feedback signaling message that includes a first field including a parent data packet sequence number of a parent data packet having the highest parent data packet sequence number sent by the transmitter, and a second field including a parent data packet sequence number of a parent data packet where the receiver has requested a reception status.

* * * * *